United States Patent
Blanchet

(10) Patent No.: US 6,797,425 B2
(45) Date of Patent: Sep. 28, 2004

(54) FUEL CELL STACK COMPRESSIVE LOADING SYSTEM

(75) Inventor: Scott Blanchet, Monroe, CT (US)

(73) Assignee: FuelCell Energy, Inc., Danbury, CT (US)

( * ) Notice: Subject to any disclaimer, the term of this patent is extended or adjusted under 35 U.S.C. 154(b) by 3 days.

(21) Appl. No.: 10/329,116

(22) Filed: Dec. 24, 2002

(65) Prior Publication Data

US 2004/0121216 A1 Jun. 24, 2004

(51) Int. Cl.[7] .................................................. H01M 8/04
(52) U.S. Cl. ........................................................ 429/37
(58) Field of Search ..................................... 429/35, 37

(56) References Cited

U.S. PATENT DOCUMENTS

| | | |
|---|---|---|
| 4,430,390 A | 2/1984 | Fekete |
| 4,692,391 A | 9/1987 | Hirota |
| 5,009,968 A | 4/1991 | Guthrie et al. |
| 5,686,200 A | 11/1997 | Barton et al. |
| 5,789,091 A | 8/1998 | Wozniczka et al. |
| 6,413,665 B1 | 7/2002 | Blanchet et al. |
| 2003/0235723 A1 * | 12/2003 | Simpkins et al. ............. 429/13 |

FOREIGN PATENT DOCUMENTS

JP 08-138721 * 5/1996

OTHER PUBLICATIONS

IPDL JPO Machine Translation for JP 08–138721 (publication date of May 1996).*

* cited by examiner

Primary Examiner—Susy Tsang-Foster
(74) Attorney, Agent, or Firm—Robin, Blecker & Daley

(57) ABSTRACT

A compression system is described for use in conjunction with a fuel cell stack having first and second ends and contained within a vessel. The system includes members connecting the first and second ends of the stack, a compression plate at the first and second ends of the stack, and compression assemblies adjacent the second end of the stack. Each compression assembly includes a compression pack for maintaining compressive load on the stack as it creeps throughout its life and to compensate for thermal expansion of the stack under varying operating conditions, and a coupling assembly that couples each compression pack to one of the members. Each compression assembly is at least partially disposed exterior to the vessel, with compression packs mounted to the second compression plate outside the stack vessel and coupling assemblies provided to connect each compression pack to the members, and forming a gas seal between the inside of the vessel and the surrounding space. An additional compression plate is provided at the first end of the stack, inside the stack vessel, to which the force from the spring packs is applied through the members. Both compression plates are separated from the end plates of the stack by a layer of compliant material which allows the compression plates to flex while the end plates remain flat.

58 Claims, 6 Drawing Sheets

FUEL CELL STACK COMPRESSIVE LOADING SYSTEM

BACKGROUND OF THE INVENTION

This invention relates to fuel cells and, in particular, to systems for compressing planar fuel cell stacks. More specifically, this invention relates to mechanical systems for maintaining a compressive load on stacks of high temperature fuel cells.

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery, has a negative (anode) electrode and a positive (cathode) electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells must be stacked in series with an electrically conductive separator plate between each cell.

A conventional fuel cell stack typically has several hundred fuel cells in series. In order to work properly, intimate contact must be maintained between all cells in the stack. Adequate contact must exist during all stack operating conditions for the duration of the stack's life. Factors to be considered in achieving this requirement include manufacturing tolerances of the cell components, non-uniform thermal expansion of the cell components during operation and long term consolidation of the cell components resulting in shrinkage of the stack.

Accordingly, a variety of requirements are placed on the system used to compress the fuel cell stack. The system must apply enough load to overcome the manufacturing tolerances early in life to bring the cell components into intimate contact. The load must also be great enough during operation to prevent the cells from delaminating due to the inevitable thermal gradients within the stack. At the same time, the compressive load should not be so great as to cause excessive shrinkage of the stack during its life as this places undue demands on auxiliary stack hardware and on the required follow up of the compression system itself. An additional requirement is that the system does not completely relax over time to insure that adequate stack pressure is maintained through the end of stack life.

Conventional fuel cell stack designs use one of a number of mechanisms for applying compressive load to the stack. U.S. Pat. No. 4,430,390 describes spring members which run within the manifolds of the fuel cell stack attaching to the end plates and forcing them toward each other. This design is not desirable for high temperature systems such as molten carbonate and solid oxide stacks because the spring members would need to be excessively large and be constructed of exotic, corrosion resistant materials to withstand the high temperature environment. U.S. Pat. No. 4,692,391 describes a design where the end plates are directly connected by rigid tensile members such as bolts or threaded rods. However, this system provides practically no load following capability to maintain stack compression as the stack shrinks.

U.S. Pat. No. 5,686,200 describes small, twisted wire or ribbon springs which may be used to apply load to individual cells within a stack. This design is inappropriate for large area fuel cells as the separator plates to which the springs are attached could not be constructed to be stiff enough to insure adequate load was delivered to the central area of the cells. U.S. Pat. No. 5,789,091 describes the use of continuous compression bands which are wrapped around the stack and placed in tension. Again this method suffers from inadequate follow-up for stacks with significant long term creep.

U.S. Pat. No. 5,009,968 describes a stack compression system which utilizes a thin end plate structure so as to minimize temperature gradients across its thickness thereby minimizing thermal distortions of the end plate. It also describes the use of a resilient pressure pad between the pressure plate and the end plate to minimize the effect of thermal distortions in the pressure plate on the end plate. This design suffers from excessive electrical resistance and non-uniform electrical current collection in such a thin end plate structure.

U.S. Pat. No. 6,413,665 describes one method of stack compression previously employed by the assignee of the subject application in which rigid tie bars are used to span the top end plate. Rigid tie rods are connected to the tie bars and to a mechanical linkage near the bottom of the stack. This linkage connects the tie rods to a spring assembly located under the bottom end plate and oriented at a nearly right angle to the tie rod. This design is complicated and expensive due to the mechanical components which make up the linkage.

Another method of stack compression previously employed by the assignee of the subject application utilizes pressurized bellows to apply compression to the stack. A series of large bellows are disposed in a vessel that houses the stack. The bellows are located between the compression and end plates of the stack at each end. The compression plates are tied together with rigid tie rods and the bellows are pressurized with nitrogen, thereby applying load to the stack. This system is less reliable than a mechanical system because even the smallest gas leak will cause the bellows to depressurize. Also, the bellows are expensive as they must be designed to withstand the high temperature environment inside the fuel cell vessel. A further limitation of this design is that an actively controlled gas delivery system must be provided to ensure stack compression load is maintained. Yet another drawback of this design is that any maintenance that must be performed on the bellows requires that the vessel be opened and the adjacent compression plate be removed.

It is an object of the present invention to overcome the above and other drawbacks of conventional fuel cell stack compression systems. It is another object of the invention to provide a compression system that is easy and relatively inexpensive to assemble and maintain. It is a further object of the invention to provide a fuel cell stack compression system that can prolong the operating life of the stack. It is an additional object of the present invention to provide a compression system for use in conjunction with a fuel cell stack housed within a vessel, whereby compressive force can be adjusted without requiring dismantling of the vessel. It is another object of the invention to provide a compression system that accommodates flexing of compression plates during operation of the fuel cell stack. It is yet another object of the present invention to provide a compression system for use with either a horizontally disposed or vertically disposed fuel cell stack.

SUMMARY OF THE INVENTION

The above and other objects are achieved by the present invention, which overcomes the disadvantages of conventional compression systems by providing a fuel cell stack compression system with compression assemblies which are at least partially outside the fuel cell stack vessel. The compression system of the present invention is used in conjunction with a fuel cell stack having first and second ends and enclosed within a vessel having first and second end walls facing the first and second stack ends. The compression system includes: a first compression plate inside the vessel at the first end of the stack; a second compression plate exterior to the vessel and abutting its second end wall and facing the second end of the stack; at least one member extending along a face of the stack, the member or members each having a first end connected to the first compression plate and a second end extending to the second end wall of the vessel; and at least one compression assembly, each compression assembly being coupled to a second end of a member, and a portion of the compression assembly being disposed exterior to the vessel.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
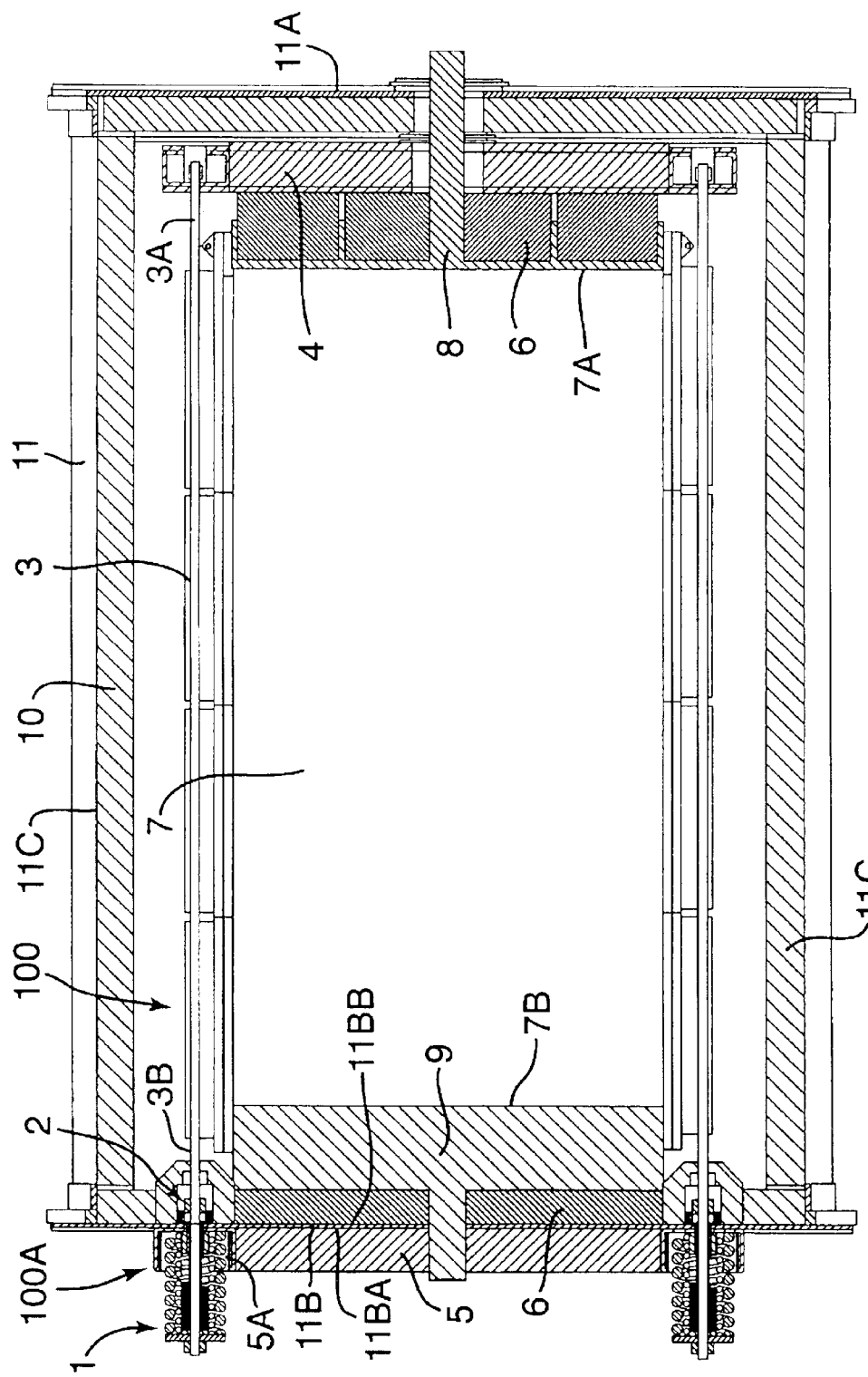
FIG. 1 is a cross-sectional view of a fuel stack showing the compression system of the present invention.

FIG. 1 shows a compression system 100 in accordance with the principles of the present invention. The compression system 100 is used in conjunction with a fuel cell stack 7 which is entirely enclosed within a vessel 11. The fuel cell stack 7 has first and second ends 7A and 7B which face first and second end walls 11A and 11B of the vessel 11. The fuel cell stack 7 also has end plates 8 and 9 at its first and second ends 7A and 7B. The vessel 11 further includes a cylindrical wall 11C and a layer of insulation 10 on portions the interior surfaces of the walls 11A–11C.

The compression system 100 serves to provide compressive force to the end plates 8 and 9 of the stack 7 so as to maintain electrical contact of the stack components as stack the components change during operation. As shown, the compression system 100 includes members or rods 3 having first and second ends 3A and 3B. The compression system additionally includes first and second compression plates 4 and 5 and compression assemblies 10A. The compression assemblies 100A exert a force on the rods 3 which, in turn, provide a force on the compression plate 4 which forces the stack 7 against the compression plate 5, thereby compressing the stack.

In accordance with the principles of the present invention, a portion of each of the compression assemblies 100A is disposed exterior of the vessel 11. In further accord with the invention, the compression plate 5 is also disposed exterior of the vessel.

More particularly, the compression plate 5 is mounted or attached, for example, by welding, to the exterior surface 11BA of the end wall 11B of the vessel 11. Each compression assembly 100A, in turn, includes a compression pack 1 which is mounted in a pocket 5A of the compression plate 5. Each compression assembly further includes a coupling assembly 2 which is mounted on the interior surface 11BB of the end wall 11B of the vessel 11. The coupling assembly 2 couples the corresponding compression pack 1 to the second end of 3B of a rod 3. The first end 3A of each rod 3, in turn, is attached to the compression plate 4 with, for example, a nut and washer.

With this configuration, the compression packs 1 and coupling assemblies 2 are adapted to communicate a force to the second ends 3B of the rods 3. This force is carried by the rods so that the first ends 3A of the rods exert a force on the compression plate 4 against the stack 7. This force is carried to and taken up by the compression plate 5 through the second end wall 11B of the vessel 11. The stack is thereby subjected to a compressive force to maintain the contact of the stack components.

The compression packs 1 store energy to provide a force to the rods 3 sufficient to compress the stack 7 and to provide follow up as the stack shrinks during operation. As discussed further below with respect to FIGS. 2 and 3, in the present illustrative embodiment, the compression packs 1 include multiple springs arranged to maximize the cell-to-cell contact in the stack.

Spring assemblies provide additional reliability and lower costs and do not require active control, as compared to compression packs which employ pressurized bellows. However, it is within the contemplation of the invention that pressurized bellows or like components can be used in fabricating the compression packs 1. In any case, regardless of the type of pack used, in accord with the invention, the packs 1 are located outside the vessel 11. This permits low cost materials to be used for the packs 1, as well as permits the packs to be easily accessible for adjusting of the compression system and for repair.

As shown in FIG. 1, the coupling assemblies 2 connecting the compression packs 1 to the rods 3 are each a sealed bellows type coupling. This type of coupling permits the necessary force transfer, while it also accommodates the lateral and longitudinal shifts of the rod 3 due to rotation of the rod because of thermal expansion. It likewise prevents gas from leaking out of the vessel 11, as further described below.

As can also be seen in FIG. 1, the first and second compression plates 4 and 5 are mechanically separated from the first and second stack end plates 8 and 9 by a compliant separating material 6. The compliant separating material 6 allows the end plates 8 and 9 to remain flat while the compression plates 4 and 5 are able to flex. The relationship between the compression plates 4 and 5 and the compliant separating material 6 is described in greater detail below with respect to FIG. 5.

Figure 2:
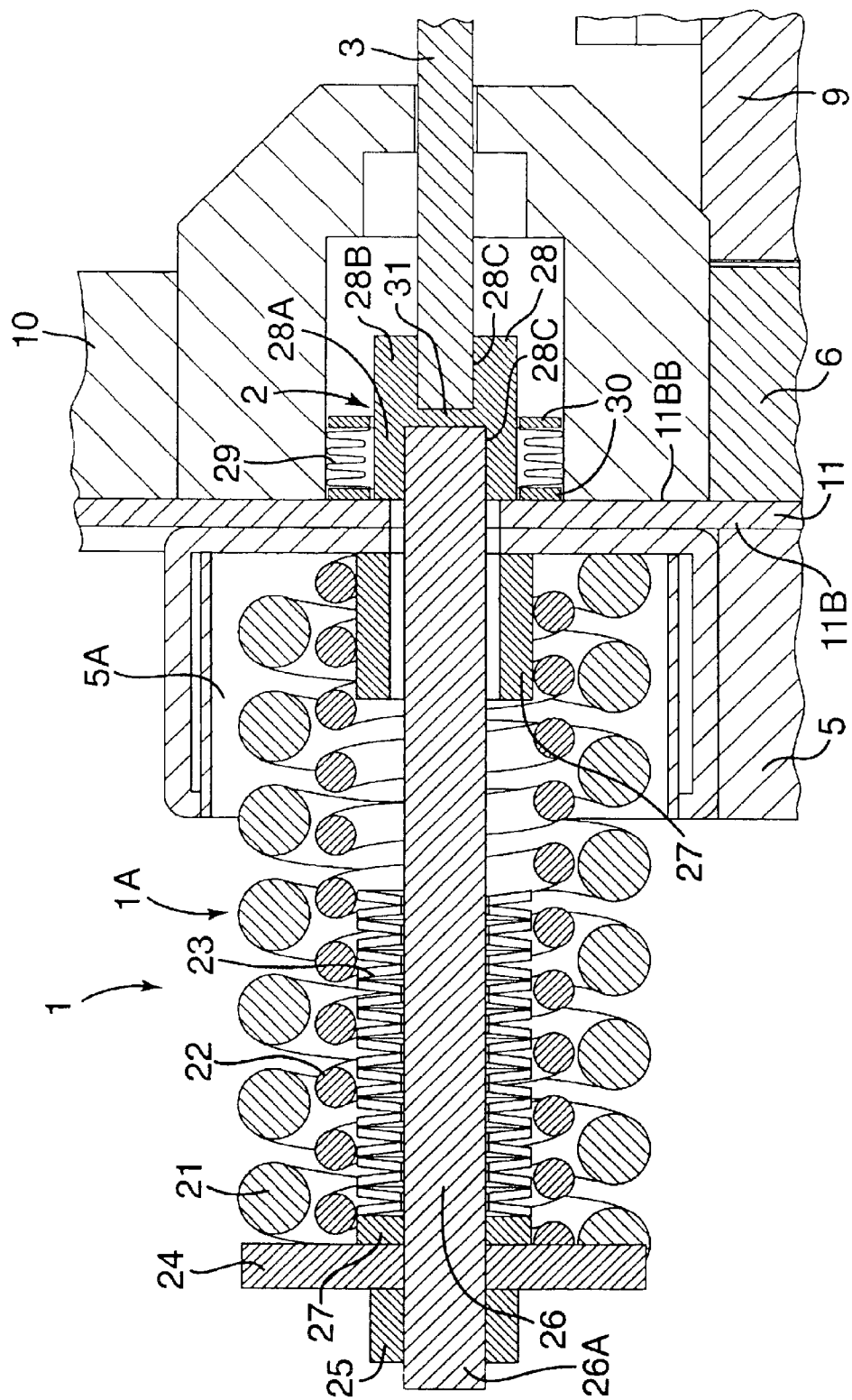
FIG. 2 is a detailed view of the compression pack and bellows-type coupling in the compression system of the present invention as shown in FIG. 1.

Referring to FIG. 2, each compression pack 1 includes a spring assembly 1A having multiple concentric springs, of which the two outermost springs are coil springs 21, 22. The innermost spring is a series of Belleville disks 23, or wave springs, arranged in parallel so as to provide a non-linearly decreasing load profile, as described further below with respect to FIG. 4. The multiple springs 21 and 22 and the Belleville disks 23 are disposed around a shaft 26 which extends between a captivating plate 24 and the compression plate pocket 5A, the latter serving as a fixed base plate for the spring assembly. Spacers 27 surrounding the shaft 26 space the Belleville disks 23 from the pocket 5A and the captivating plate 24. An adjustable nut 25 at a first end 26A of the shaft 26 retains the springs, disks and spacers on the shaft.

The thickness of the spacers 27 is selected so that the Belleville disks 23 begin to be compressed at a predetermined point in the stroke of the shaft 26. The Belleville disks 23 also serve to properly position the coil springs 21, 22 along the axis of the shaft 26. The combination of spacers 27 and Belleville disks 23 additionally provides a positive stop for the shaft 26 internal to the spring assembly 1A once the Belleville disks have been completely flattened. During initial compression of the fuel cell stack, this allows a very high pressure to be applied to the stack without the need for external stop mechanisms and without yielding of the springs. In general, this configuration of the compression packs 1 maximizes cell-to-cell contact and prevents excessive creep of the stack.

Figure 3:
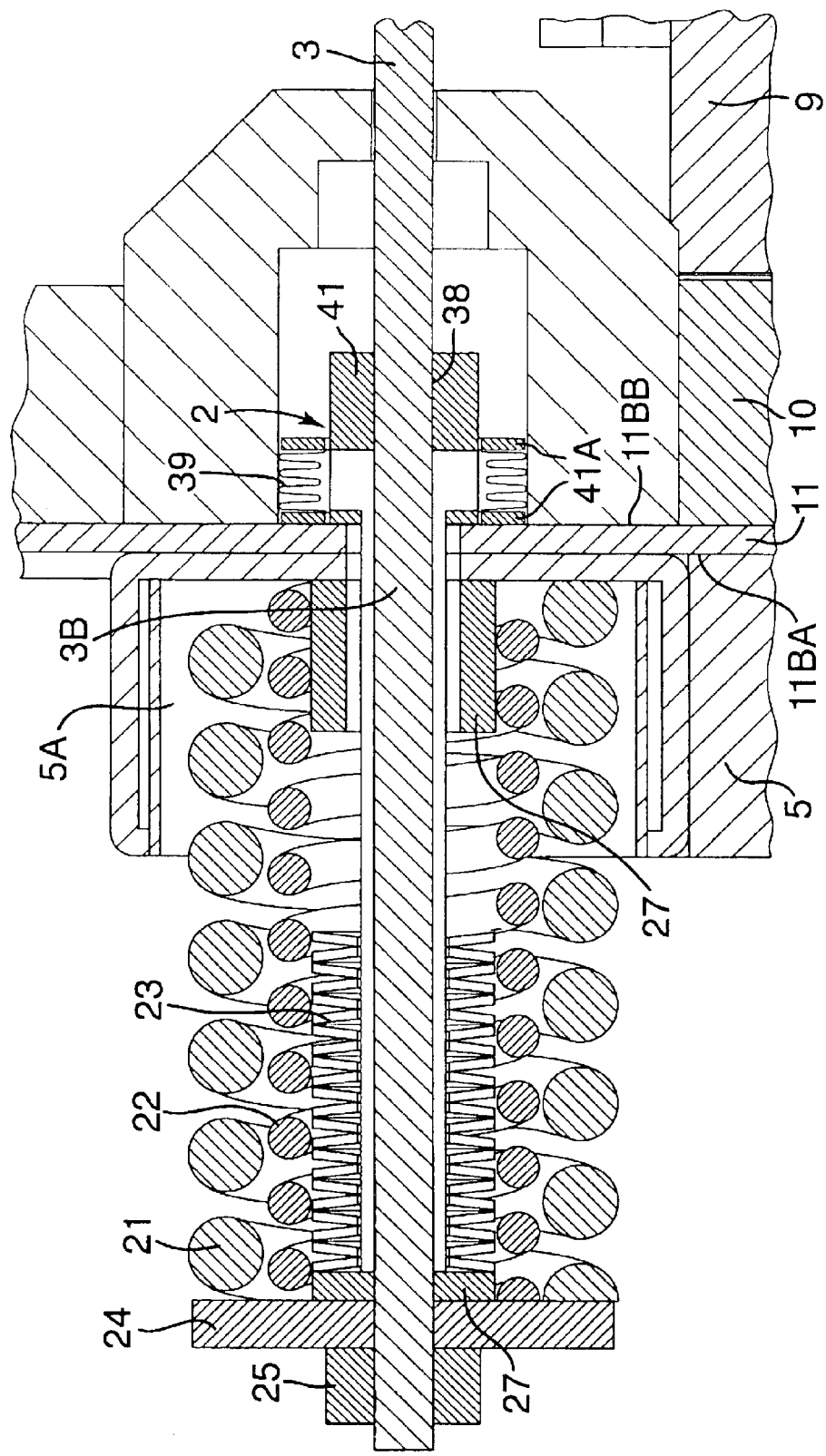
FIG. 3 is a detailed view of an alternate bellows sliding-shaft seal in the compression system of the invention as shown in FIG. 1.

In the illustrative embodiments of FIGS. 2 and 3, the concentric springs 21–23 of the spring assemblies 1A are formed so that one or more of the springs have varying or different lengths in uncompressed state so as to provide a non-linearly, decreasing load or compressive force on the fuel cell stack 7 as it shrinks. In the case shown, the Belleville disk pack 23 in uncompressed state is shorter in length than the coil springs 21 and 22 in uncompressed state. This advantageously provides good consolidation pressure early in stack life while minimizing the long term, total stack shrinkage, as further described below with respect to FIG. 4.

As also discussed above, in accord with the invention, the compression packs 1 are disposed exterior to the vessel 11 and can therefore be constructed from inexpensive, low temperature materials. Additionally, the packs 1 are easily accessible for maintenance or repair, or for adjustment of the stack compressive load if so desired. To adjust the stack compressive load, a maintenance technician would hold the compression pack shaft 26 with a wrench and turn the nut 25 to either tighten or loosen the springs as necessary.

In the present illustrative embodiment, the compression packs 1 are also located at each corner of the stack 7 and are oriented with their axes parallel to the rods 3, thereby eliminating the need for levers and bearings required in conventional compression systems. Also, as shown in FIG. 2, mounting of the spring assemblies 1A in the pockets 5A of the compression plate 5 is advantageous in minimizing the distance the each spring assembly extends outward, thereby minimizing the overall length of the structure.

FIGS. 2 and 3 also show two different configurations of the coupling assemblies 2 of the compression assemblies 10A. In FIG. 2, the coupling assembly 2 comprises a coupling member 28 having first and second sections 28A and 28B, the former section 28A abutting the inner surface 11BB of the second end wall 11B of the vessel 11. Each section 28A and 28B of the coupling member 28, furthermore, is provided with a threaded bore 28C which extends to a central part 31 of the coupling.

The shaft 26 of the spring assembly 1A of the compression pack 1 is threaded into the bore 28C in the section 28A of the coupling member 28, while the rod 3 is threaded into the bore 28C of the section 28B. This connects the compression pack 1 to the rod 3.

Flanges 30 are provided at opposite ends of the first section 28A of the coupling member 28. A bellows 29 is attached to and extends between the flanges 30.

With this configuration for the coupling member 28, any gas on the inside of the vessel 11 is completely sealed from the gas on the outside of the vessel. Moreover, the bellows 29 allows the coupling member 28 to move axially to accommodate changes or creep in the stack components and also allows lateral movement as the rods 3 rotate due to thermal expansion of the stack.

In the coupling assembly 2 of FIG. 3, the assembly comprises a cylindrical coupling member 41 through which the end of the rod 3 sealingly slides. The member 41 includes at its one end flanges 41A. A flexible bellows 39 is situated between the flanges 41A.

With this configuration of the coupling member 41, the member acts as a sliding seal for the rod 3. Also, the bellows 39 acts to align the coupling 41 with the rod 3 so that the coupling is not required to have a full axial range of movement. The coupling member 41 permits the use of a less expensive bellows for the bellows 39, but it also has a higher risk of leakage at the interface 38 between the rod 3 and the coupling.

Figure 4:
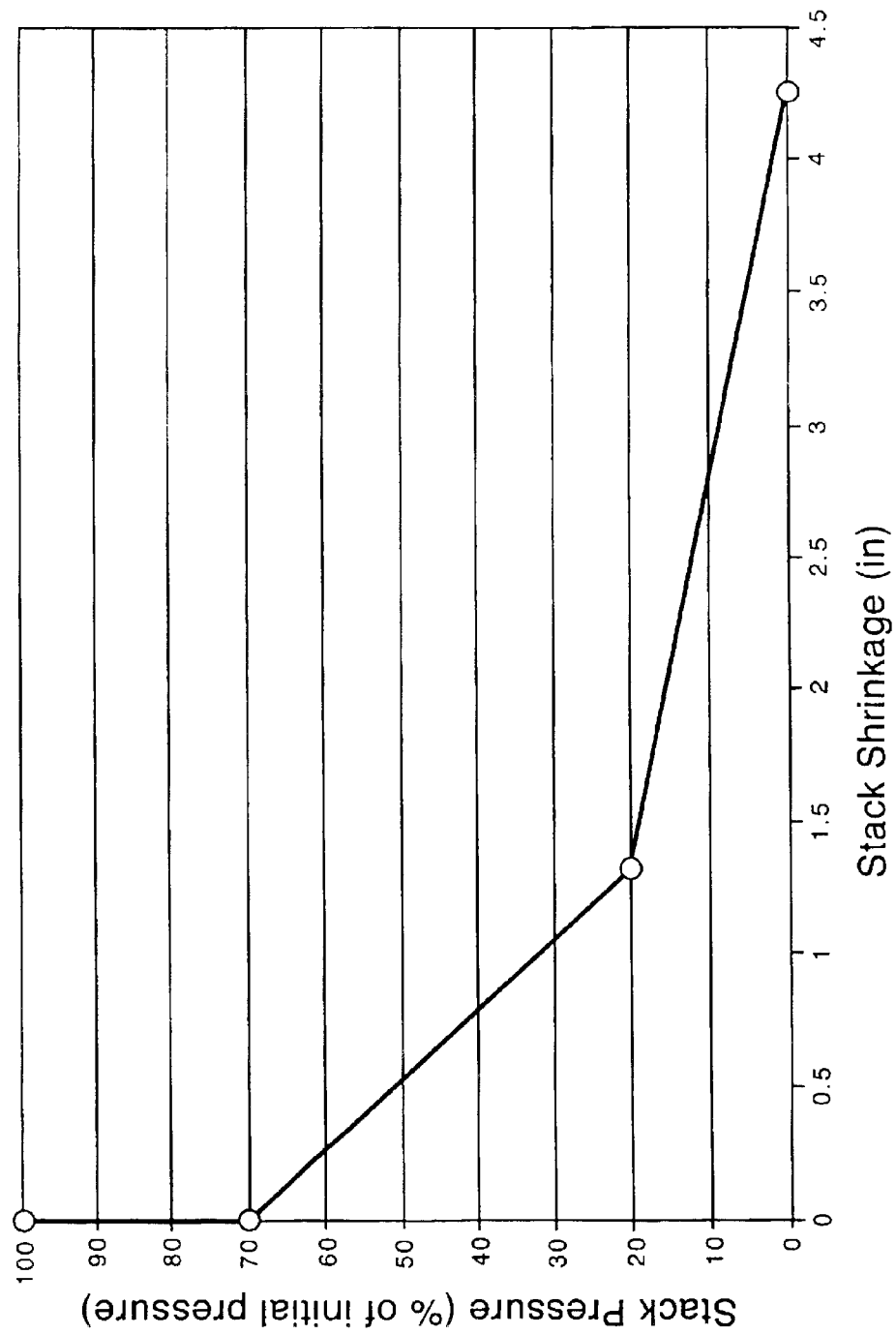
FIG. 4 is a graph illustrating one possible stack loading profile achievable with the fuel cell stack compression system of FIG. 1.

FIG. 4 is a graph displaying one possible stack loading profile achievable with the compression system 100 of the present invention. As shown, in the load profile of FIG. 4, a high load is applied at the beginning of stack life and the load decreases non-linearly as the stack shrinks.

More particularly, during initial compression of the stack, the Belleville disk packs 23 of the compression packs shown in FIGS. 2 and 3 are fully flattened or compressed as the load decreases to approximately 70% of the initial compressive pressure. Little or no stack shrinkage occurs during this initial compression stage. Next, as the stack shrinks between 1 and 1.5 inches, the stack compressive pressure drops from 70% to 20% of the initial pressure and both the coil springs 21, 22 and the Belleville disk packs 23 of the compression packs are working together in parallel and in partial compression. As the stack shrinks beyond 1.5 inches, the Belleville disks are no longer compressed and only the partially compressed coil springs 21, 22 are applying a force or load to the stack.

Looking again at FIG. 1, as can be appreciated, the first and second compression plates 4 and 5 are structural members that distribute the load from the compression packs 1 through the rods 3 to the first and second stack end plates 8 and 9. In order to maintain very stiff and flat end plate surfaces and accommodate flexing of the second compression plate 5 under a compressive load and in order to maintain intimate and uniform electrical contact between the end plates 8 and 9, which collect electrical current, and the end cells of the fuel cell stack 7, the stiff end plate structure at each end of the stack 7 is mechanically isolated from the corresponding compression plate by the compliant material 6. The material 6, typically, might be a microporous silica insulation (such as that manufactured by Microtherm, Inc. and Thermal Ceramics, Inc.).

In addition to insulation, the compliant material 6 may be made from other suitable materials which provide flexibility and support. In general, the compliant material should be a resilient material which acts like a spring to make up for flexing of the compression plate, or a porous structure which takes a permanent shape to make up for such flexing. In either case, flexing of the compression plates under load is unavoidable.

As discussed above, in the compression system 100 of the invention, the second compression plate 5 is fixed in position at the exterior surface 11BA of the vessel 11 and is used to mount the compression packs 1. As is also discussed above, the first compression plate 4 is located within the vessel 11 and is free to move, allowing the stack 7 to shrink, grow and bend due to thermal expansion under various operating conditions. The plate 4, in turn, is under compressive load from the rods 3 and the compression assemblies 1. In this manner, the first compression plate 4 is urged in a direction toward the second compression plate 5 while the second compression plate 5 remains stationary.

Figure 5:
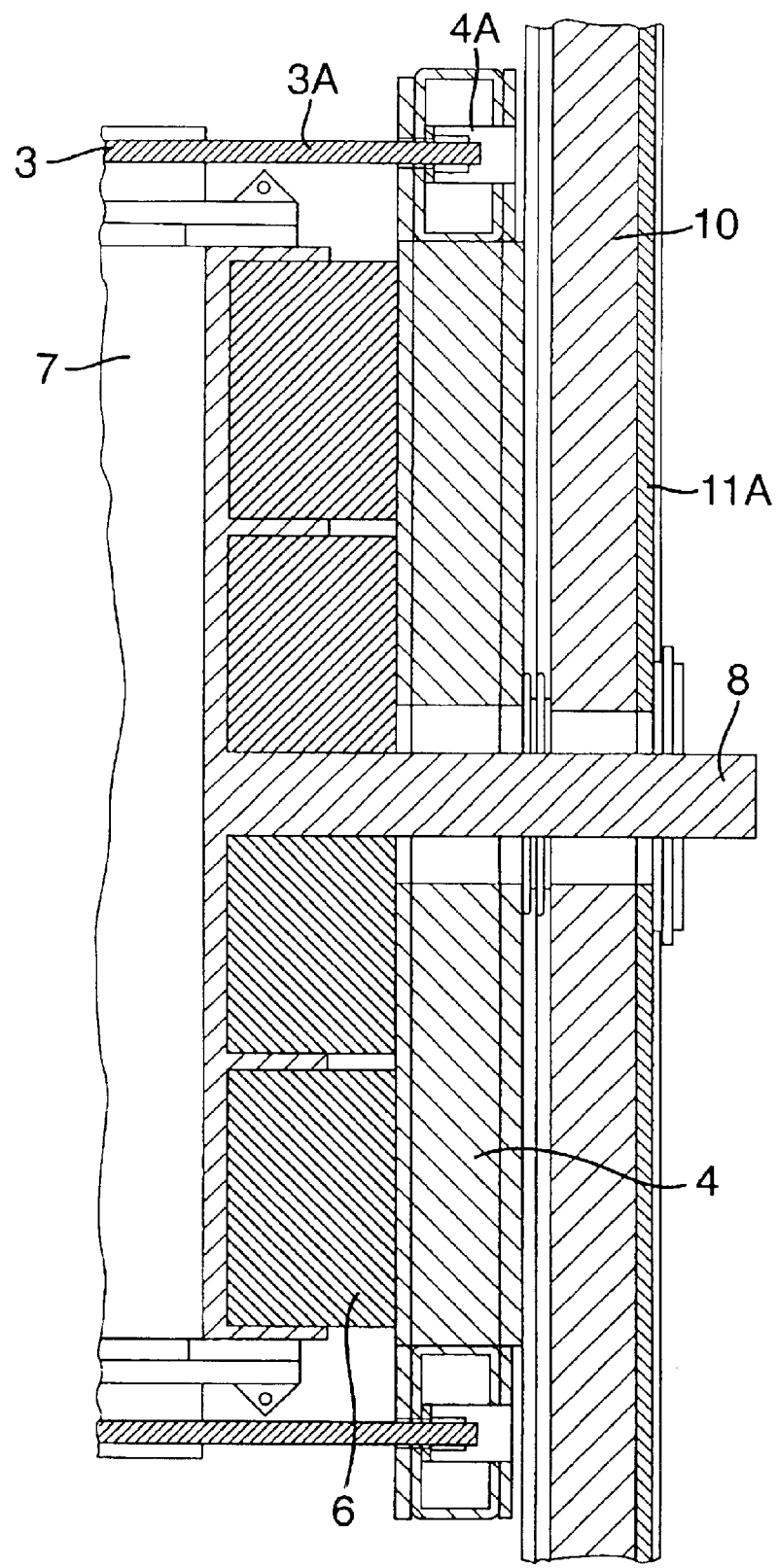
FIG. 5 is a detailed cross-sectional view of one of the compression plates isolated from the end plate by compliant material in the compression system of FIG. 1.

FIG. 5 shows in greater detail the attachment of the ends 3A of the rods 3 to the first compression plate 4. Pockets 4A in the compression plate receive the rod ends 3A. Attachment members such as a nut and washer then connect the rods to the plate.

Figure 6:
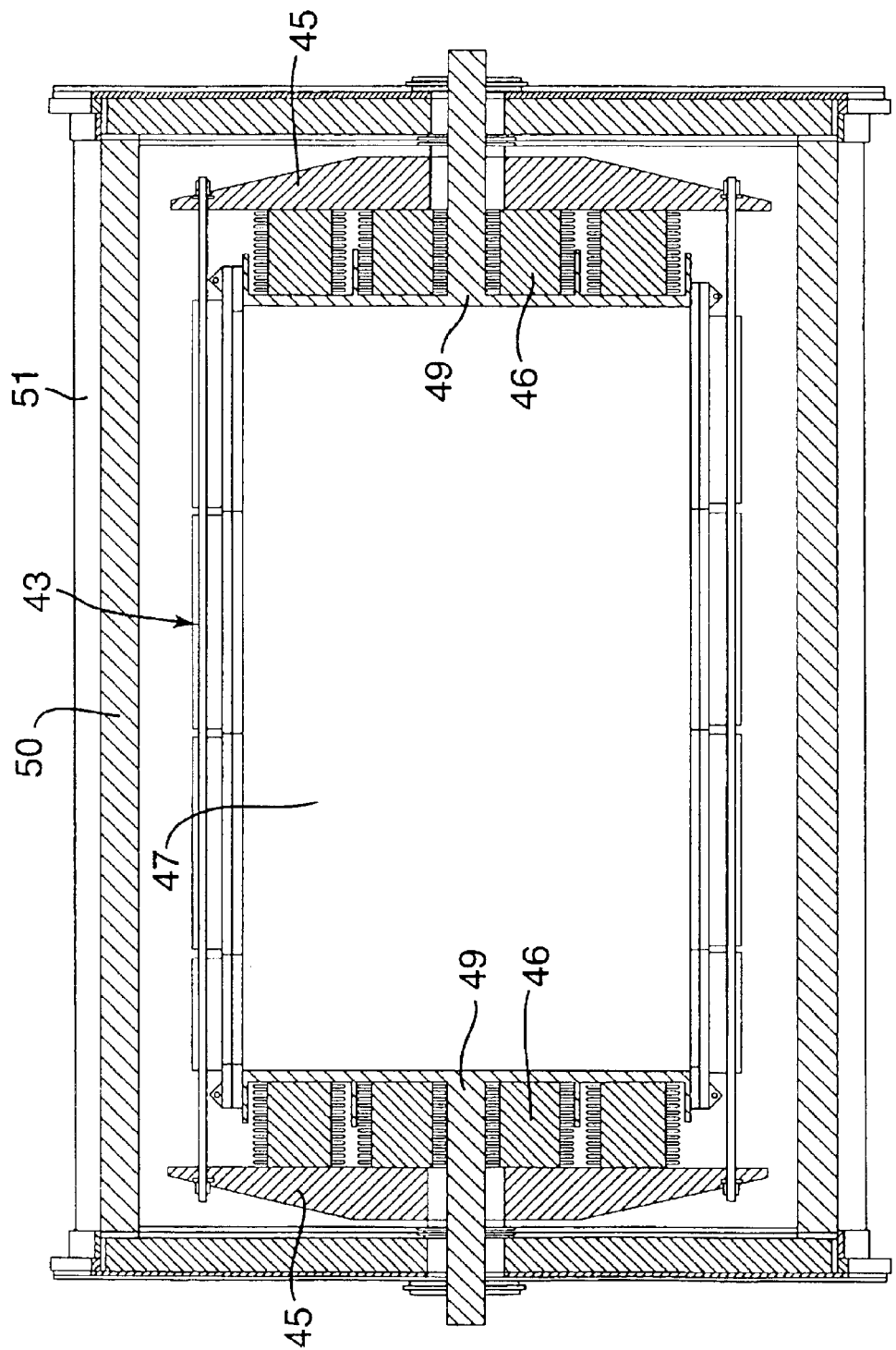
FIG. 6 is a cross-sectional view of a fuel cell stack showing the compression system of the prior art, in which pressurized bellows applies loading to the stack through the end plates.

In contrast to the known compression system depicted in FIG. 6, in which pressurized bellows 46 within the vessel 51 enclosing the stack 47 with insulation 50 are used on each end of the stack to compress the stack through the stack end plates 49 and rods 43, the present invention forces the stack to shrink from one end only. The system shown in FIG. 6 follows stack shrinkage from both ends in order to minimize sliding stresses on manifold gaskets. However, it has been determined by experiment that these gaskets can accept movement of the stack from one end only, which is the type of movement allowed by the compression system 100 of the invention. Movement from one end also provides an added advantage for the fuel cell stack, since no movement needs to be factored into the gas delivery and exhaust system of the stack.

In addition, the disposition of the compression assembly of the compression system 100 of the invention outside or partially outside of the vessel enclosing the stack is advantageous over the pressurized bellows shown in the system of FIG. 6 or any other compression component similarly situated in known stack compression systems. In the system shown in FIG. 6, for example, the pressurized bellows 46 is disposed between compression plates 45 and end plates 49, requiring that the stack be shut down, the stack vessel be opened and the compression system disassembled in order to adjust pressure, conduct maintenance or to replace the bellows. By contrast, in the compression system of the invention, the spring assembly can be serviced without opening the stack vessel or otherwise interfering with the operation of the fuel cell stack.

In all cases it is understood that the above-described apparatus, method and arrangements are merely illustrative of the many possible specific embodiments that represent applications of the present invention. Numerous and varied other arrangements can be readily devised in accordance with the principles of the present invention without departing from the spirit and the scope of the invention.

What is claimed is:

1. A compression system for providing a compressive force to a fuel cell stack having first and second ends and enclosed within a vessel having first and second end walls facing said first and second ends, respectively, of said fuel cell stack, said compression system comprising:

a first compression plate adapted to be disposed interior of said vessel facing the first end of the fuel cell stack and a second compression plate adapted to be disposed exterior of said vessel abutting the second end wall of said vessel and facing the second end of the fuel cell stack;

one or more members, each member being adapted to extend within said vessel along a face of the stack and having a first end connected to said first compression plate and a second end extending at least toward said second end wall of said vessel; and one or more compression assemblies, each compression assembly having at least a portion of that compression assembly disposed exterior of said vessel and including a coupling assembly adapted to sealingly couple the compression assembly to a second end of a different one of said one or more members.

2. A compression system in accordance with claim 1, wherein:

each compression assembly is axially aligned with the one of the one or more members to which that compression assembly is coupled.

3. A compression system in accordance with claim 1, wherein:

said portion of each of said compression assemblies includes a compression pack which exerts a force on the second end of the one of the one or more members to which that compression assembly is coupled.

4. A compression system according to claim 3, wherein; the coupling assembly of each of said compression assemblies coupling the compression pack of that compression assembly to the second end of the one or more members to which the compression assembly is coupled, the compression pack and the coupling assembly of each compression assembly together being adapted to communicate a compressive force to said first compression plate through the force exerted on the second end of the one of the one or more members to which that compression assembly is coupled.

5. A compression system in accordance with claim 4, further comprising:

first and second layers of compliant material, said first layer of compliant material being adapted to be disposed between said first end plate of said fuel cell stack and said first compression plate, and said second layer of compliant material being adapted to be disposed between said second end plate and the inner surface of the second end wall of said vessel.

6. A compression system in accordance with claim 4, wherein:

at least a portion of the coupling assembly of each compression assembly is adapted to be disposed within said vessel.

7. A compression system in accordance with claim 6, wherein:

the coupling assembly of each compression assembly is disposed entirely within said vessel.

8. A compression system in accordance with claim 4, wherein:

the coupling assembly and the compression pack of each compression assembly are aligned axially with each other and with the one of the one or more members to which that compression assembly is coupled.

9. A compression system in accordance with claim 8, wherein
at least a portion of the coupling assembly of each compression assembly is adapted to be disposed within said vessel.

10. A compression assembly system accordance with claim 9, wherein:
the coupling assembly of each compression assembly is disposed entirely within said vessel.

11. A compression system in accordance with claim 4, wherein:
the coupling assembly of each compression assembly includes a coupling member engaging a second end of the one of the one or more members to which that compression assembly is coupled, each coupling member being adapted to move axially and laterally relative to the one of the one or more members engaged by the coupling member as the one of the one or more members rotates due to thermal expansion.

12. A compression system in accordance with claim 11, wherein:
the coupling member of each compression assembly is disposed within said vessel.

13. A compression system in accordance with claim 12, wherein:
the coupling member of each compression assembly is adapted to engage an inner surface of the second end wall of said vessel.

14. A compression system in accordance with claim 13, wherein:
the coupling member of each compression assembly surrounds the second end of the one of the one or more members engaged by the coupling member and includes: first and second flanges spaced along the length of the coupling member; and a bellows situated between said first and second flanges.

15. A compression system in accordance with claim 14, wherein:
the second flange of each coupling member is adapted to abut the inner surface of the second end wall of said vessel.

16. A compression system in accordance with claim 15, wherein:
each coupling member has a first section and a second section, the second section of each coupling member being adapted to abut the inner surface of the second wall of said vessel and including the second flange of the coupling member.

17. A compression system in accordance with claim 16, wherein:
the coupling member of each compression assembly has: at the first section a first threaded bore to which the second end of the one of the one or more members engaged by the coupling member is threaded; and at the second section a second threaded bore to which a part of the compression pack of that compression assembly is threaded.

18. A compression system in accordance with claim 16, wherein:
the coupling member of each compression assembly is adapted so that the second end of the one of the one or more members engaged by that coupling member allows the second end of the one of the one or more members to sealing pass through the coupling member to allow engagement of the second end of the one of the one or more members with the compression pack of that compression assembly.

19. A compression system in accordance with claims 4, wherein:
each of said compression packs includes a spring assembly.

20. A compression system according to claim 19, wherein:
each spring assembly of a compression assembly is aligned with the one of the one or more members to which that compression assembly is coupled.

21. A compression system according to claim 19, wherein:
each spring assembly of a compression assembly includes: a fixed base plate; a captivating plate spaced from the fixed base plate; one or more springs situated between the base plate and the captivating plate; and a shaft extending through a center of the one or more springs, a first end of said shaft being attached to said captivating plate and a second end of said shaft engaging with the coupling assembly of that compression assembly.

22. A compression system in accordance with claim 21, wherein:
the fixed base plate of each spring assembly is formed by a pocket formed in said second compression plate.

23. A compression system according to claim 21, wherein each said spring assembly comprises a plurality of concentric springs.

24. A compression system according to claim 23, wherein at least two of said plurality of springs in an uncompressed state are of different lengths such that said spring assembly is adapted to provide a non-linear, decreasing compressive load to the fuel cell stack.

25. A compression system according to claim 23, wherein each said spring assembly comprises an inner spring, middle coil spring and an outer coil spring.

26. A compression system according to claim 25, wherein:
said inner spring is in the form of a Belleville disk pack; and
said Belleville disk pack in an uncompressed state is shorter in length than said middle and outer coil springs in an uncompressed state.

27. A compression system according to claim 26, wherein each said spring assembly includes one or more spacer members disposed at one or both ends of the shaft of that spring assembly.

28. A compression system according to claim 21, wherein the coupling assembly of each compression assembly comprises a coupling member having first and second sections adapted to be connected, respectively, to the second end of the one of the one or more members to which that compression assembly is coupled and to the second end of the shaft of the spring assembly of that compression assembly.

29. A compression system according to claim 28, wherein:
said first and second sections of the coupling member of the coupling assembly of each compression assembly each have a threaded part, and the second end of the one of said one or more members coupled to that compression assembly is threaded into the threaded part of the first section of the coupling member and the shaft of the spring assembly of that compression assembly is threaded into the threaded part of the second section of the coupling member.

30. A compression system in accordance with claim 29, wherein:
each threaded part of a coupling member is a threaded bore of the coupling member.

31. A compression system according to claim 30, wherein each coupling member further comprises:
   first and second flanges formed, respectively, at the opposite ends of said second section of that coupling member; and
   a flexible bellows attached to and disposed between said first and second flanges;
   wherein said bellows is adapted to allow the coupling member to move axially relative to the one of the one or more members connected to that coupling member and to the shaft of the spring assembly connected to that coupling member and to move laterally relative to the one of the one or more members connected to that coupling member as the one of the one or more members rotates due to thermal expansion.

32. A compression system in accordance with claim 31, wherein:
   the second section of each of said coupling members is adapted to abut the inner surface of the second end wall of said vessel.

33. A compression system according to claim 19, wherein:
   each spring assembly includes: a fixed base plate; a captivating plate spaced from the fixed base plate; one or more springs situated between the base plate and the captivating plate; and
   a second end of the one of the one or more members aligned with that spring assembly extends through the center of the one or more springs of that spring assembly and is attached to the captivating plate of that spring assembly.

34. A compression system in accordance with claim 33, wherein
   the fixed base plate of each spring assembly is formed by a pocket in the second compression plate.

35. A compression system according to claim 34, wherein:
   the coupling assembly of each compression assembly includes an attaching member for attaching the second end of the one of the one or more members coupled to that compression assembly to the captivating plate of the spring assembly of that compression assembly.

36. A compression system according to claim 35, wherein:
   the coupling assembly of each compression assembly further includes a coupling member having first and second sections and disposed around the second end of the one of the one or more members coupled to that compression assembly, the coupling member forming a sliding shaft seal with the one of the one or more members.

37. A compression system according to claim 36, wherein the coupling member of the coupling assembly of each compression assembly further comprises:
   first and second flanges formed, respectively, at the opposite ends of the second section of that coupling member; and
   a flexible bellows attached to and disposed between the first and second flanges of that coupling member;
   wherein the bellows is adapted to align the coupling member with the one of the one or more members forming a sliding shaft seal with the coupling member.

38. A compression system according to claim 37, wherein each said spring assembly comprises a plurality of concentric springs.

39. A compression system according to claim 38, wherein at least two of said plurality of springs in an uncompressed state are of different lengths such that said spring assembly provides a non-linear, decreasing compressive load to the fuel cell stack.

40. A compression system according to claim 39, wherein each said spring assembly comprises an inner spring, middle coil spring and an outer coil spring.

41. A compression system according to claim 40, wherein:
   said inner spring is in the form of a Belleville disk pack; and
   said Belleville disk pack in an uncompressed state is shorter in length than said middle and outer coil springs in an uncompressed state.

42. A compression system according to claim 41, wherein each said spring assembly includes one or more spacer members disposed around the second end of the one of the one or more members passing through the spring assembly, said one or more spacer members being situated between said Belleville disk pack and said second compression plate.

43. A compression system according to claim 4, wherein said second compression plate is immobile relative to said system and said compressive force urges the first compression plate within said vessel in a direction toward said second compression plate.

44. A compression system according to claim 1, further comprising:
   first and second layers of compliant material, said first layer of compliant material being adapted to be disposed between said first end plate of said fuel said cell stack and said first compression plate, and said second layer of compliant material being adapted to be disposed between said second end plate and the inner surface of the second end wall of said vessel.

45. A compression system according to claim 44, wherein said first and second layers of compliant material are formed of microporous silica.

46. A compression system according to claim 1, wherein said fuel cell stack and said vessel are horizontally disposed.

47. A fuel cell system, comprising:
   a fuel cell stack having first and second ends;
   a vessel enclosing said fuel cell stack and having first and second end walls facing said first and second ends, respectively, of said fuel cell stack; and
   a compression system for providing a compressive force to a fuel cell stack comprising: a first compression plate disposed interior of said vessel facing the first end of the fuel cell stack and a second compression plate disposed exterior of said vessel abutting the second end wall of said vessel and facing the second end of the fuel cell stack; one or more members, each member extending within said vessel along a face of the stack and having a first end connected to said first compression plate and a second end extending at least toward said second end wall of said vessel; and one or more compression assemblies, each compression assembly having at least a portion of that compression assembly disposed exterior of said vessel and including a coupling assembly adapted to sealingly couple the compression assembly to a second end of a different one of said one or more members.

48. A fuel system in accordance with claim 47, wherein:
   said portion of each of said compression assemblies includes a compression pack which exerts a force on the second end of the one of the one or more members to which that compression assembly is coupled; and
   the coupling assembly of each of said compression assemblies coupling the compression pack of that compression assembly to the second end of the one or more members to which the compression assembly is coupled, the compression pack and the coupling assembly of each compression assembly together being adapted to communicate a compressive force to said first compression plate through the force exerted on the second end of the one of the one or more members to which that compression assembly is coupled.

49. A fuel cell assembly in accordance with claim 48, wherein:
the coupling assembly of each compression assembly includes a coupling member engaging the second end of the one of the one or more members to which that compression assembly is coupled, each coupling member being adapted to move axially and laterally relative to the one of the one or more members engaged by the coupling member as the one of the one or more members rotates due to thermal expansion.

50. A fuel cell system in accordance with claim 49, wherein:
the coupling member of each compression assembly surrounds the second end of the one of the one or more members engaged by the coupling member and includes: first and second flanges spaced along the length of the coupling member; and a bellows situated between said first and second flanges.

51. A fuel cell system in accordance with claim 50, wherein:
the coupling member of each compression assembly has: at a first section a first threaded bore to which the second end of the one of the one or more members engaged by the coupling member is threaded; and at a second section a second bore to which a part of the compression pack of that compression assembly is threaded, said second section being in abutting the inner surface of the second end wall of said vessel.

52. A fuel cell system in accordance with claim 50, wherein:
the coupling member of each compression assembly is adapted so that the second end of the one of the one or more members engaged by that coupling member allows the second end of the one of the one or more members to sealing pass through the coupling member to allow engagement of the second end of the one of the one or more members with the compression pack of that compression assembly.

53. A fuel cell system in accordance with claim 49, wherein:
the compression pack of each compression assembly includes a spring assembly having: a base plate mounted to the outer surface of the second end wall of the vessel; a captivating plate spaced from the base plate; one or more springs situated between the base plate and the captivating plate; and a shaft extending through a center of the one or more springs, a first end of said shaft being attached to said captivating plate and a second end of said shaft engaging with the coupling assembly of that compression assembly.

54. A fuel cell system in accordance with claim 49, wherein:
each compression assembly includes a spring assembly having: a base plate mounted to the outer surface of said second end wall of said vessel; a captivating plate spaced from the fixed base plate; one or more springs situated between the base plate and the captivating plate; and
the second end of the one of the one or more members aligned with that spring assembly extends through the center of the one or more springs of that spring assembly and is attached to the captivating plate of that spring assembly.

55. A fuel cell system in accordance with claim 48, wherein:
the compression pack of each compression assembly includes a spring assembly having: a base plate mounted to the outer surface of the second end wall of the vessel; a captivating plate spaced from the base plate; one or more springs situated between the base plate and the captivating plate; and a shaft extending through a center of the one or more springs, a first end of said shaft being attached to said captivating plate and a second end of said shaft engaging with the coupling assembly of that compression assembly.

56. A fuel cell system in accordance with claim 48, wherein:
each compression assembly includes a spring assembly having: a base plate mounted to the outer surface of said second end wall of said vessel; a captivating plate spaced from the fixed base plate; one or more springs situated between the base plate and the captivating plate; and
the second end of the one of the one or more members aligned with that spring assembly extends through the center of the one or more springs of that spring assembly and is attached to the captivating plate of that spring assembly.

57. A fuel cell system in accordance with claim 48, further comprising:
first and second layers of compliant material, said first layer of compliant material being disposed between said first end plate of said fuel said stack and said first compression plate, and said second layer of compliant material being disposed between said second end plate and the inner surface of the second end wall of said vessel.

58. A fuel cell system in accordance with claim 47, wherein:
first and second layers of compliant material, said first layer of compliant material being disposed between said first end plate of said fuel said stack and said first compression plate, and said second layer of compliant material being disposed between said second end plate and the inner surface of the second end wall of said vessel.

* * * * *

UNITED STATES PATENT AND TRADEMARK OFFICE
CERTIFICATE OF CORRECTION

PATENT NO. : 6,797,425 B2
DATED : September 28, 2004
INVENTOR(S) : Scott Blanchet It is certified that error appears in the above-identified patent and that said Letters Patent is hereby corrected as shown below:

<u>Column 1,</u>
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Ninth Day of May, 2006

JON W. DUDAS
*Director of the United States Patent and Trademark Office*